United States Patent [19]

Blomeyer et al.

[11] 4,254,308
[45] * Mar. 3, 1981

[54] VANDAL RESISTANT PUBLIC TELEPHONE

[75] Inventors: Earle B. Blomeyer, Atlanta; William Q. Watson, Dunwoody; Charles T. Richardson, Jr., Lawrenceville, all of Ga.

[73] Assignee: Gladwin, Inc., Oakwood, Ga.

[*] Notice: The portion of the term of this patent subsequent to Apr. 24, 1996, has been disclaimed.

[21] Appl. No.: 31,635

[22] Filed: Apr. 19, 1979

Related U.S. Application Data

[63] Continuation-in-part of Ser. No. 911,980, Jun. 2, 1978, Pat. No. 4,151,380.

[51] Int. Cl.³ .................................................. H04M 1/12
[52] U.S. Cl. ................................................ 179/148 R
[58] Field of Search ............... 179/146 R, 148 R, 149, 179/100 R, 158, 178, 179, 148 F, 6.3 R, 147, 151, 152; 52/27, 29, 40

[56] References Cited

U.S. PATENT DOCUMENTS

| | | | |
|---|---|---|---|
| 954,701 | 4/1910 | Rogers | 179/152 |
| 2,215,799 | 9/1940 | Sherron | 179/148 R |
| 2,581,251 | 1/1952 | Glazer et al. | 179/146 R |
| 3,258,535 | 6/1966 | Nawman | 179/146 R |
| 3,338,002 | 8/1967 | Ericsson et al. | 52/40 |
| 3,393,273 | 7/1968 | Bustos | 179/6.3 R |
| 3,571,988 | 3/1971 | Nawman | 52/27 |
| 3,752,927 | 8/1973 | Bartley et al. | 179/146 R |
| 4,151,380 | 4/1979 | Blomeyer et al. | 179/148 R |

Primary Examiner—Thomas A. Robinson
Attorney, Agent, or Firm—James L. Bean

[57] ABSTRACT

A coin-operated public telephone apparatus employs one or more telephone units and coin operating and collecting equipment enclosed within rigid components of a support structure for maximum security and protection against vandalism and to enable installation where conventional coin-operated telephones requiring separate enclosures cannot be utilized due to space limitations. The coin box is spaced from the telephone unit to minimize the likelihood of damage by attempted theft. The structure is adaptable for use by persons of different heights including standing adults as well as handicapped persons in wheelchairs or as a drive-up unit for use by persons in an automobile.

14 Claims, 31 Drawing Figures

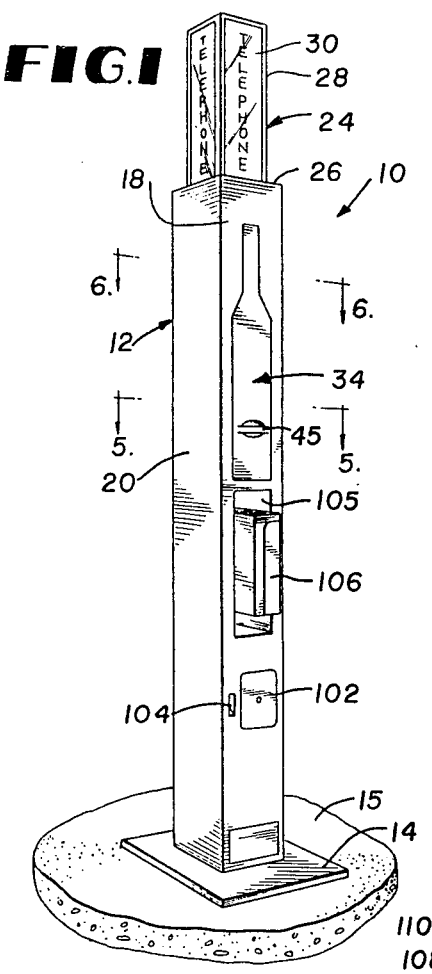
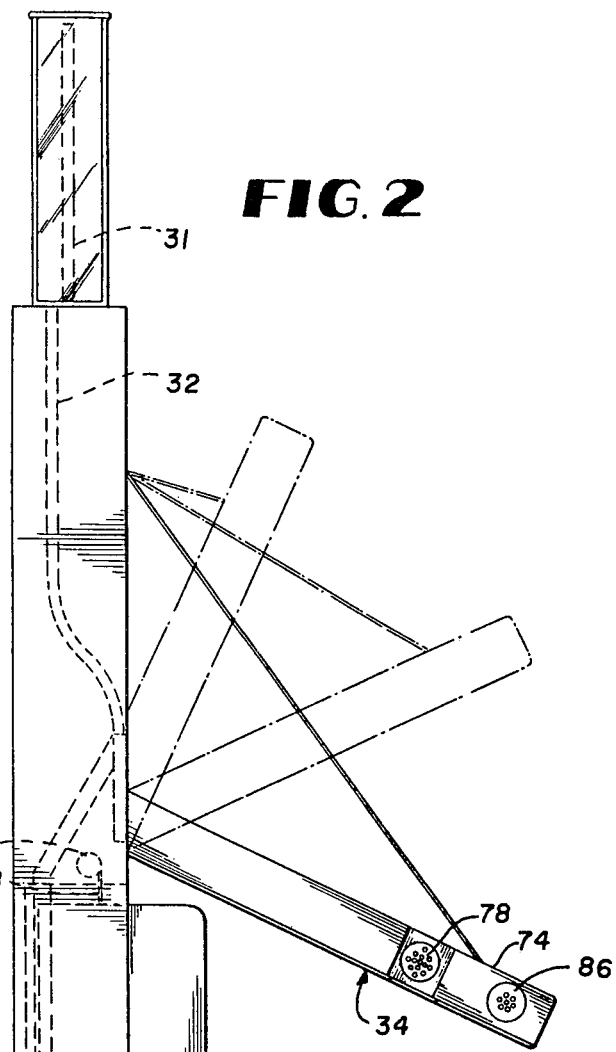
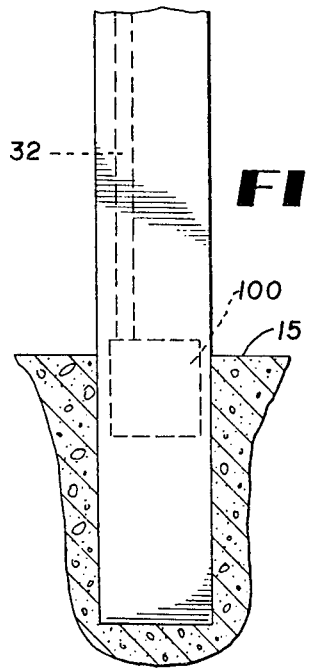
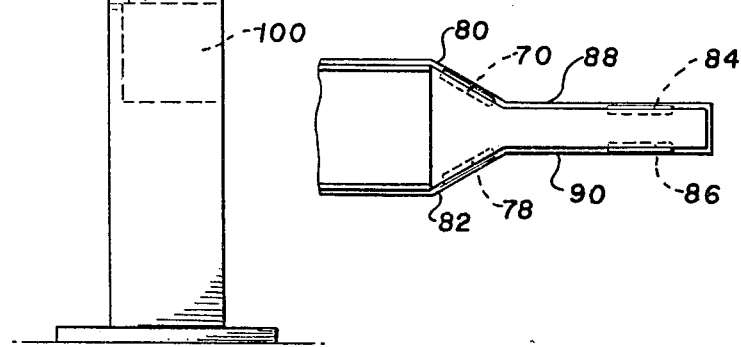

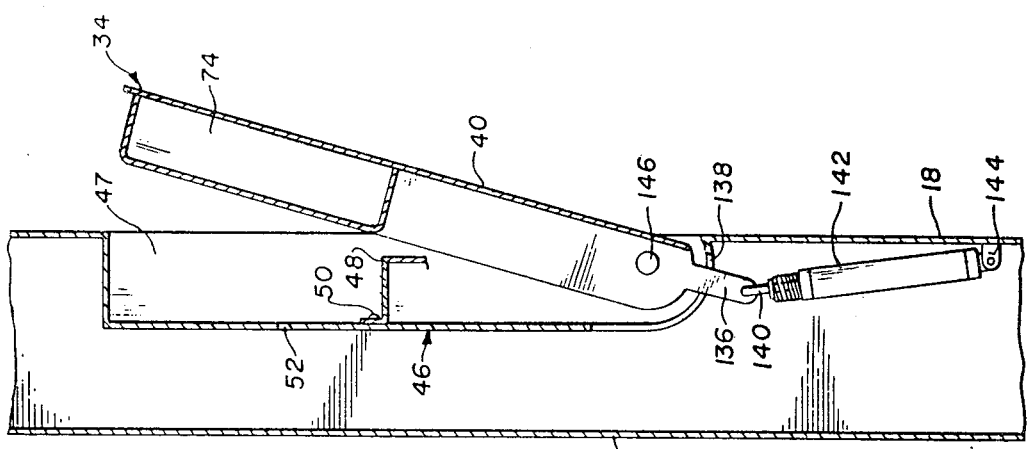
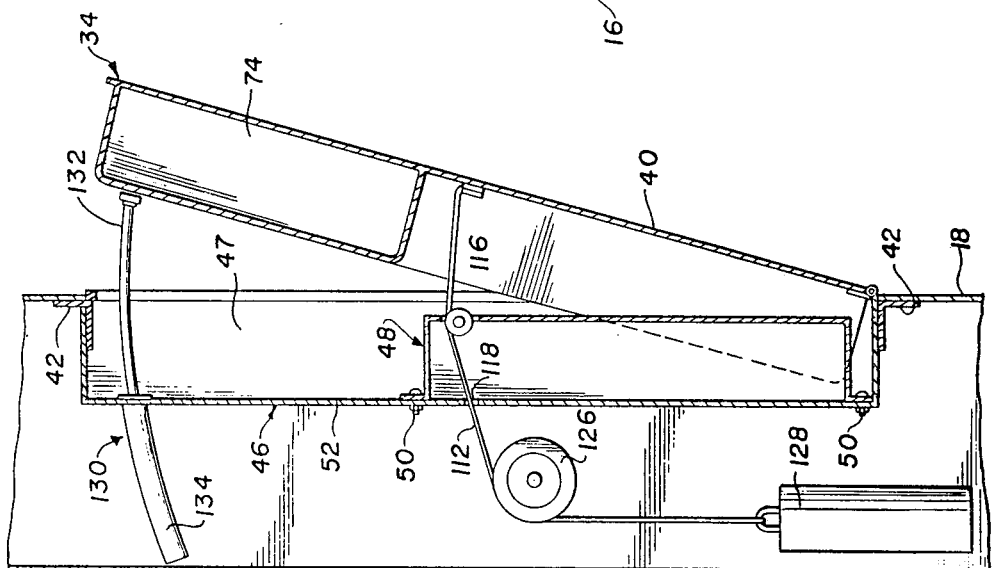
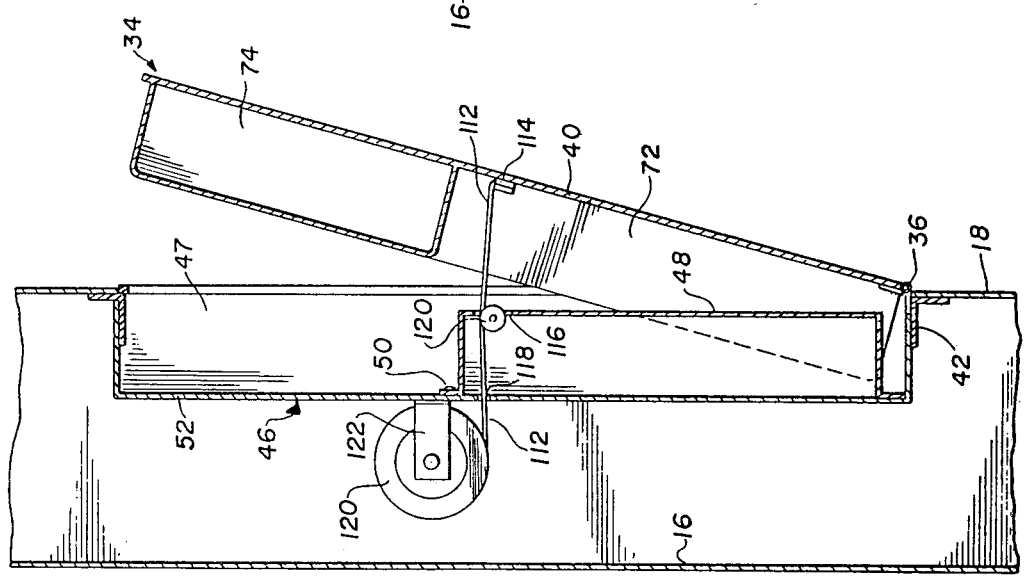

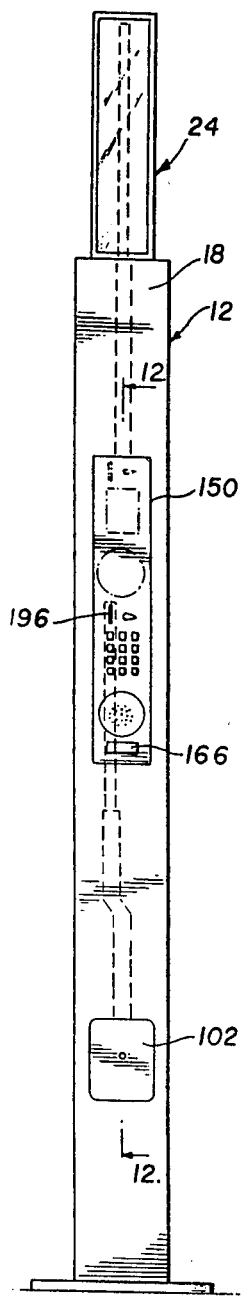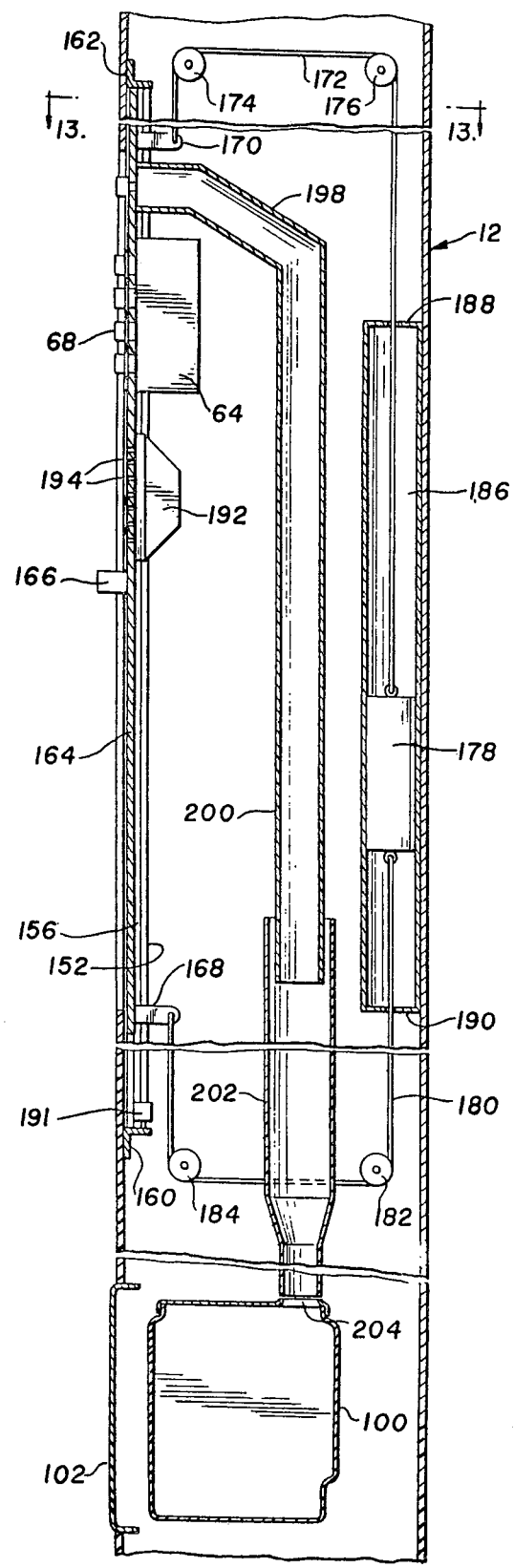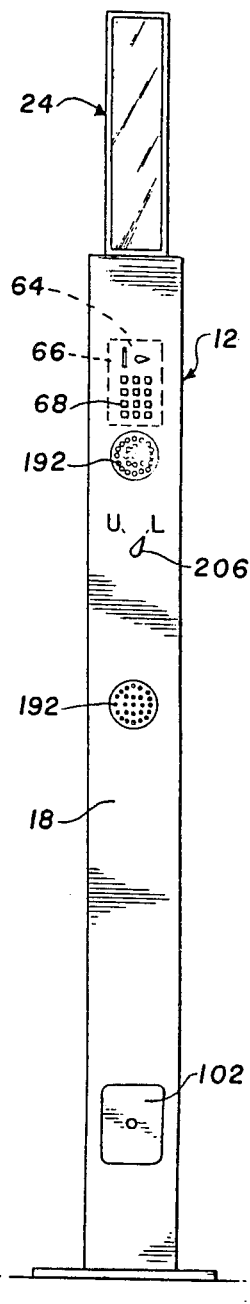

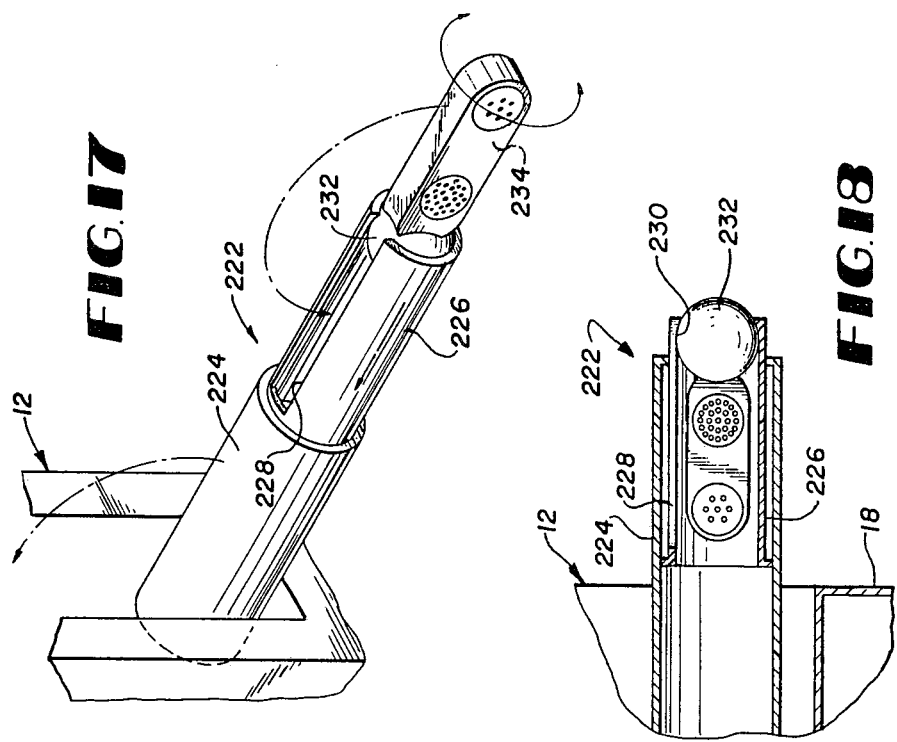
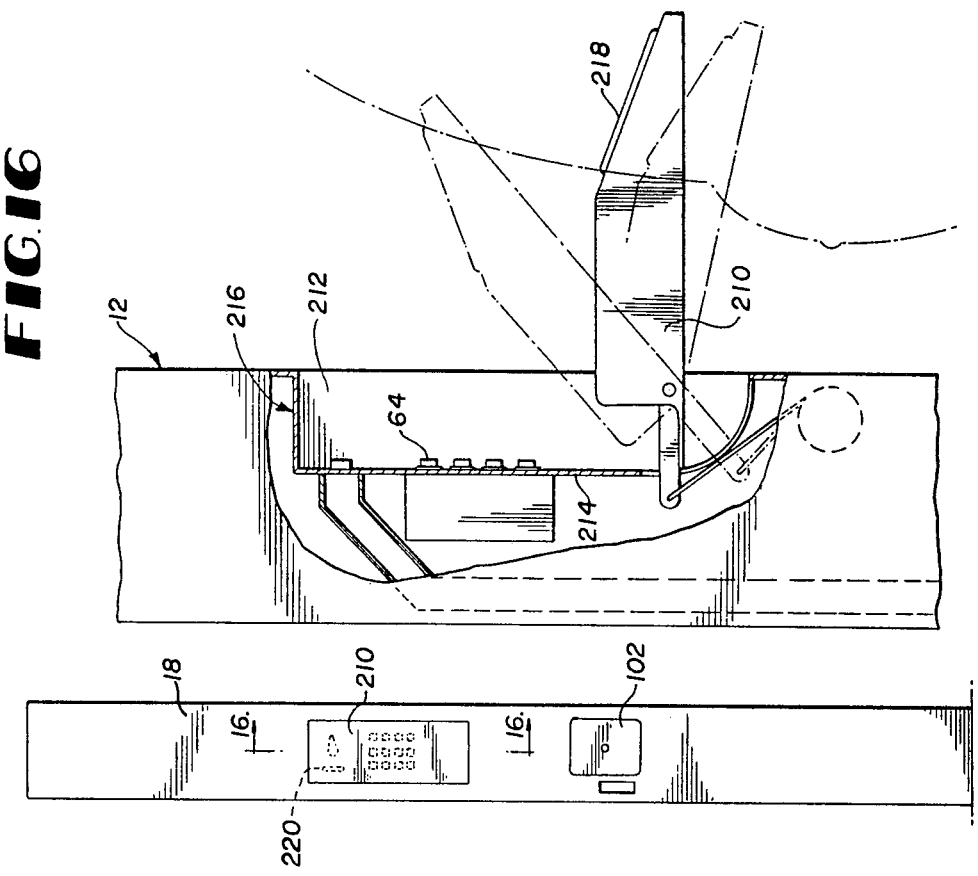

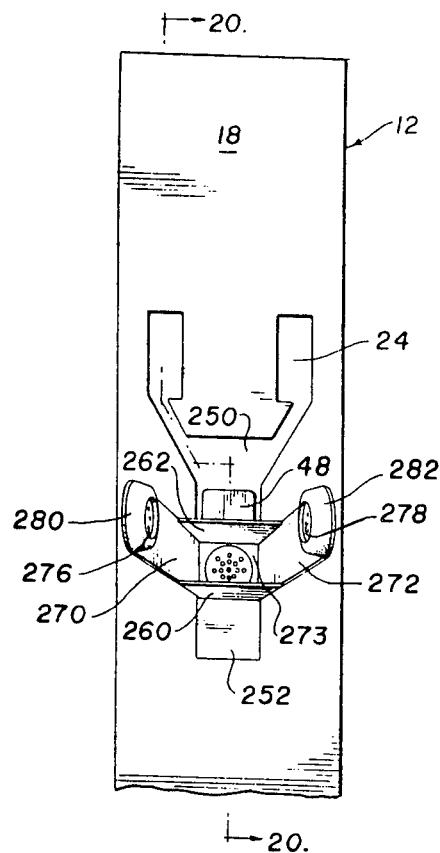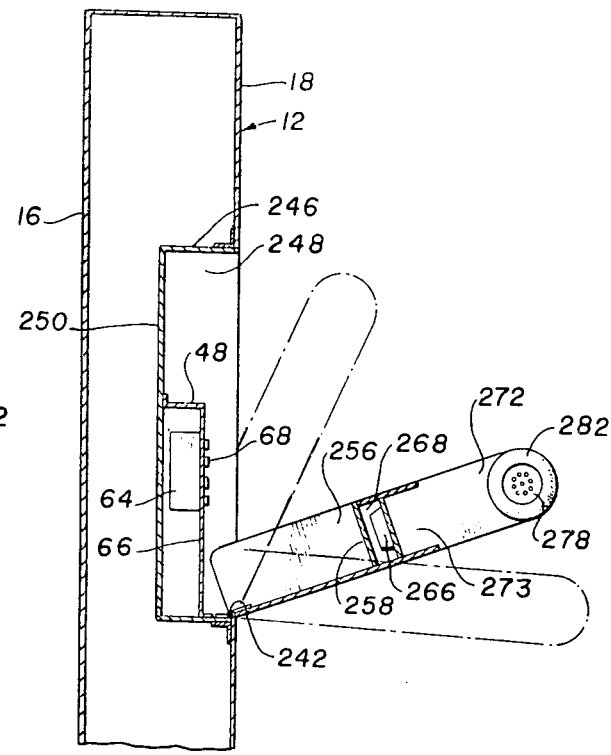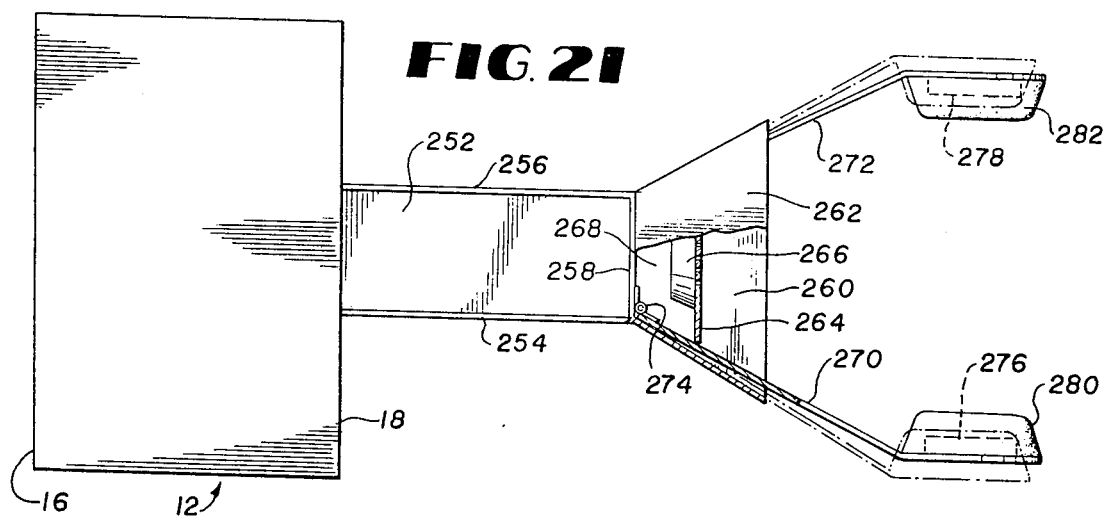

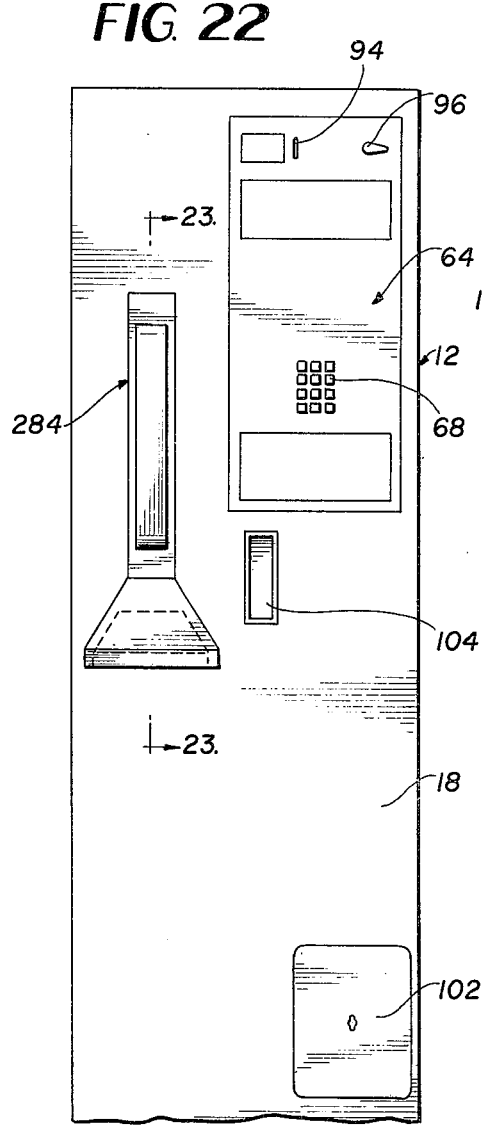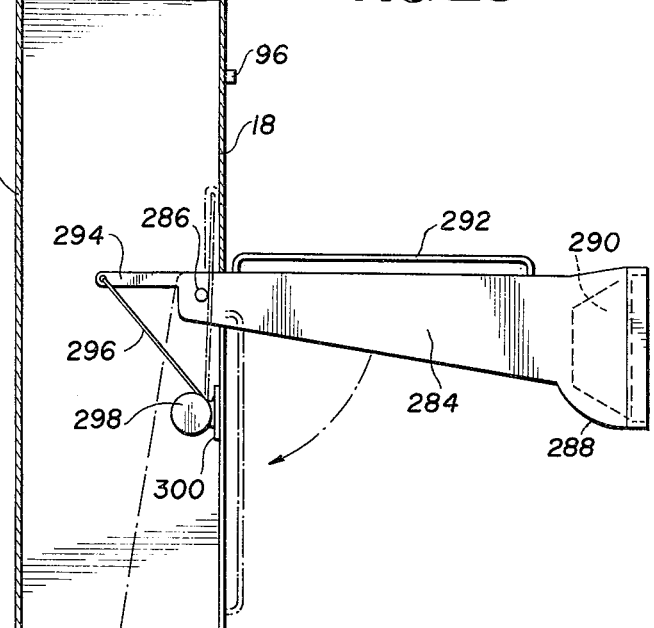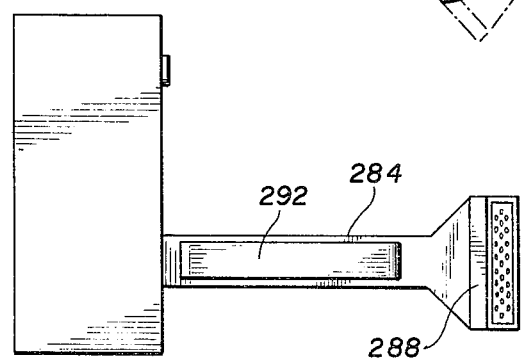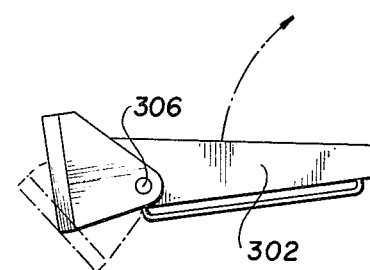

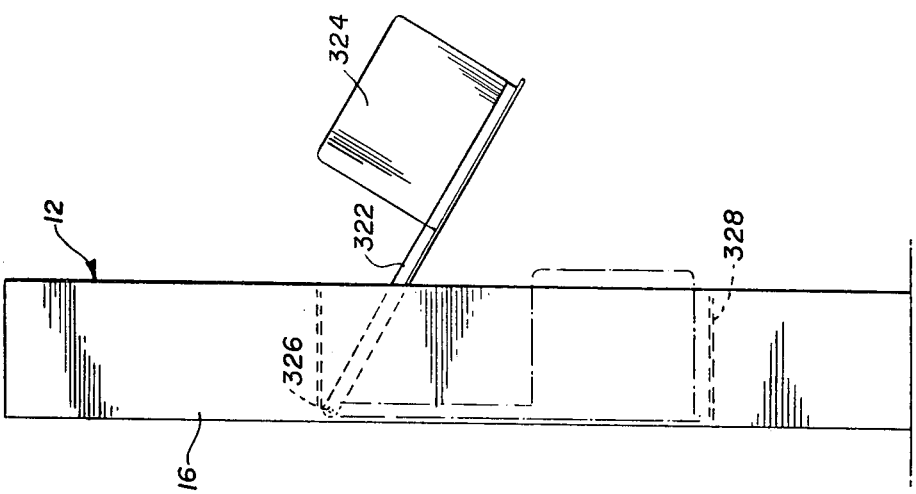
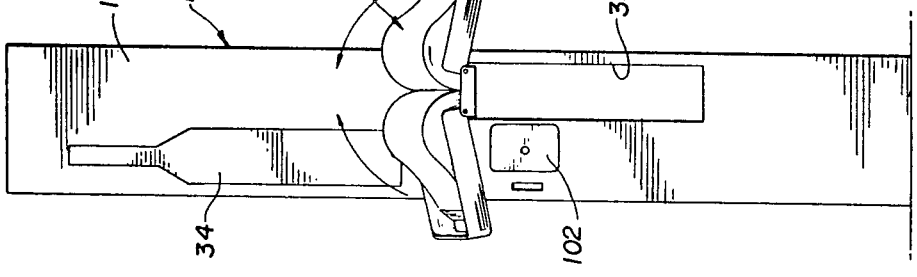
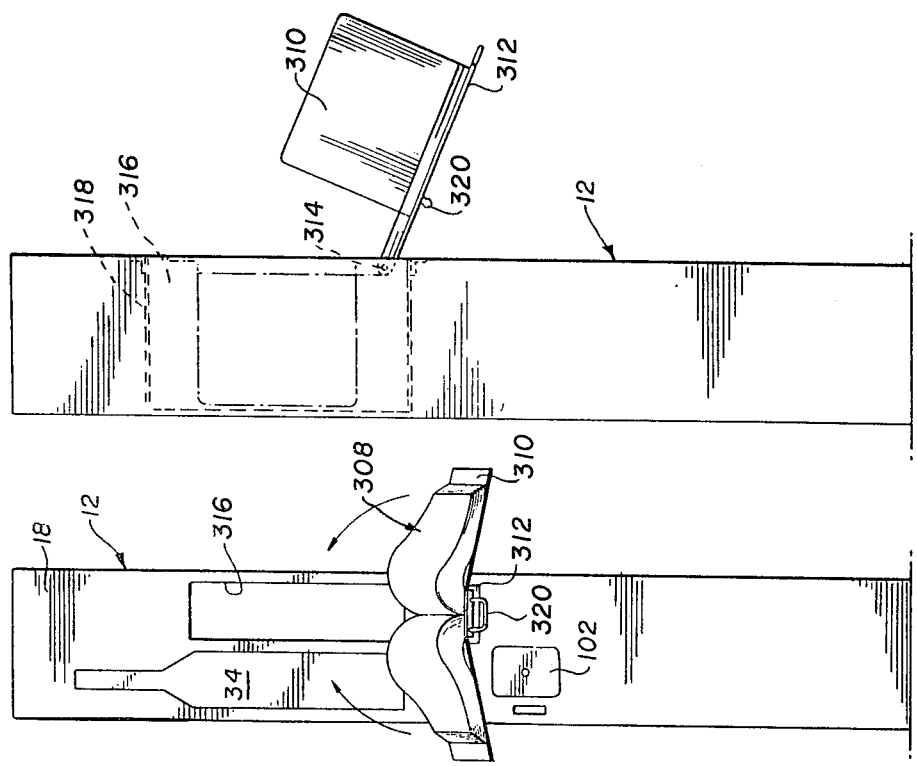

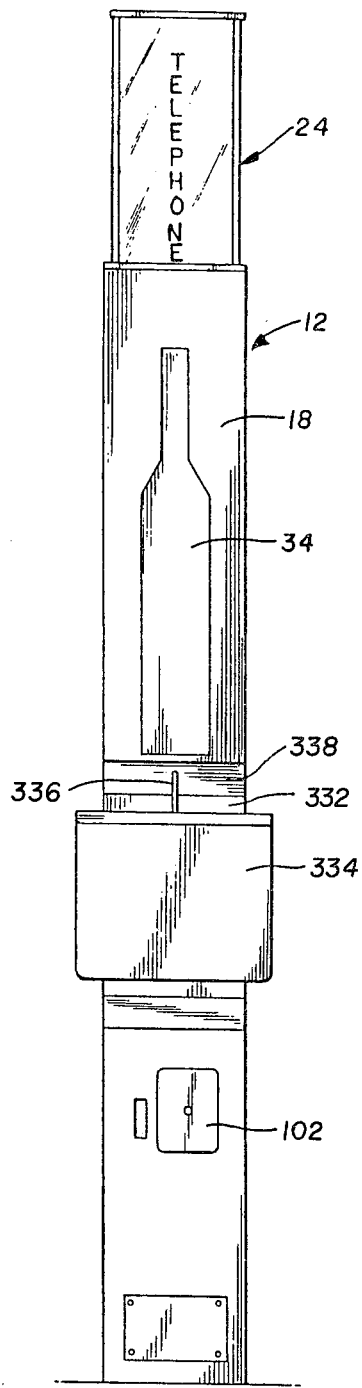
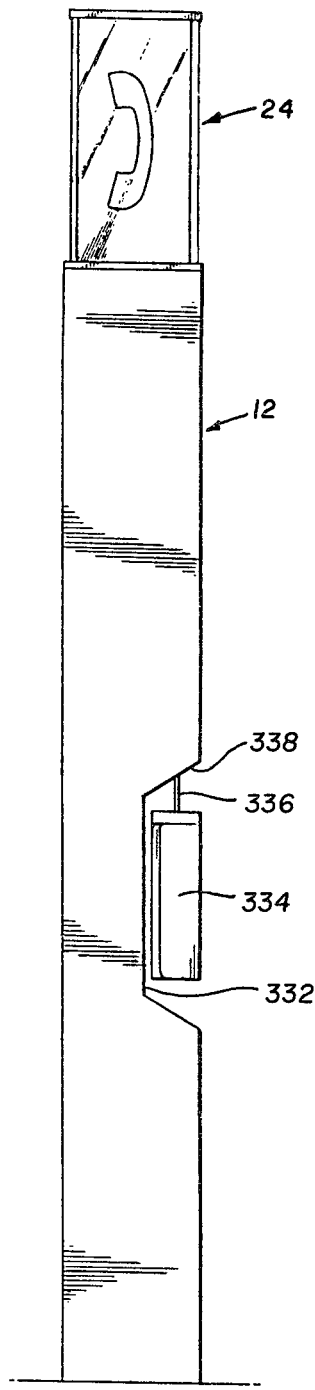

VANDAL RESISTANT PUBLIC TELEPHONE

CROSS-REFERENCE TO RELATED APPLICATIONS

This is a continuation-in-part of copending application Ser. No. 911,980, filed June 2, 1978, now U.S. Pat. No. 4,151,380, issued Apr. 24, 1979.

BACKGROUND OF THE INVENTION

This invention relates to coin-operated public telephones and more particularly to an improved vandal-resistant, compact public telephone installation in which the telephone is enclosed in rigid components of a support structure for maximum security and weather protection.

The prior art public telephones generally have employed a separate housing enclosing the phone, coin box, and associated equipment, with the phone dial being operated from the exterior of the housing and with the hand set, or transmitter-receiver, connected to the housing by a cord containing the required conductor elements. In such installations, the cord is conventionally encased within a flexible steel sheath in an effort to protect the instrument against vandalism. The separate housing is attached by mounting bolts to a supporting structure such as a pole, mounting plate, or the like. Such housings generally are not weather-proof, however, and do not provide complete protection for either the enclosed equipment or the exposed components such as the hand set, with the result that a separate shield or enclosure is normally provided, either in the form of a weather hood, or a completely enclosed booth. Even such housings offer some exposure to weather because the hoods have an open front and booths are generally provided with doors that remain open when not in use.

Since the coin box of conventional public phones is located within the housing enclosing the phone equipment, the delicate components of the equipment are highly vulnerable to damage by any attempt at coin theft involving forced entry into the enclosure.

The prior art public telephones generally have been installed at a height making it difficult or impossible for them to be used by short persons including children and handicapped persons confined to wheelchairs. While the hand set of such phones is conventionally attached by a cord capable of reaching to a lower level, the storage hook for the hand set, the phone dial, and coin slot, particularly for walk-up type telephones as opposed to booth phones, has been at a height making use of the phone difficult or impossible by such short people. And it is generally not possible for the handicapped confined to wheelchairs to use phones in conventional booths. It is, of course, known to install telephones at a lower height to accommodate the handicapped but this practice has generally involved either two separate telephone installations, or a single installation so low that it is difficult to use by the average adult person while standing.

Prior art public telephones also have generally not been installed in positions capable of access from automobiles due at least in part to the space requirement of the weather hoods generally used with such phone installations.

It is, therefore, an object of the present invention to provide an improved coin-operated public telephone mounted within a rigid supporting structure and which is highly resistant to damage by vandalism.

Another object of the invention is to provide such a public telephone which is protected against the weather by the enclosing support structure without requiring a separate weather hood or enclosure.

Another object of the present invention is to provide such a public telephone including transmitter and receiver apparatus mounted within the supporting structure and capable of use at various levels.

Another object of the invention is to provide a free-standing public installation requiring a minimum of space.

SUMMARY OF THE INVENTION

The foregoing and other objects of the invention are achieved in accordance with the present invention by providing a combination instrument enclosure and supporting structure for a coin-operated telephone installation whereby the conventional practice of mounting the telephone in a separate housing which is bolted to a support structure is avoided. This arrangement enables a reduced initial cost while providing greater security for the components of the telephone installation, and for the coin box which may be located some substantial distance from the telephone instrument in the support structure. The arrangement further provides a substantial reduction in total space occupied, thereby enabling installation where a conventional public telephone cannot be installed due to space requirements such as on busy city sidewalks, against building walls, or adjacent curbs for access by persons seated in an automobile.

An important feature of one embodiment of the present invention resides in providing a swingable, rigid arm on the support structure, which arm encloses both the receiver and transmitter to thereby eliminate the conventional hand set connected to the instrument housing by a cord and which has been the subject of substantial vandalism. The rigid metal arm is supported for movement between an upright position in which it fits within the support structure and forms a part of the installation housing, and a lowered position in which it swings outwardly to the desired position of use whether by a tall standing person, a handicapped person in a wheelchair, or a passenger in a vehicle. The arm is supported for automatic return to the upright, closed position at the termination of use, thereby eliminating the present nuisance of receivers being left off of the hook and tying up both the telephone and office switching equipment.

In an alternate embodiment of the invention, the telephone instrument may be supported for sliding movement vertically along the supporting post for use at any desired level. A third embodiment employs a plurality of transmitters and receivers located at various heights along the support structure, with the units being interconnected so that the person using the installation can readily select and use the transmitter-receiver combination closest to his height, but without requiring separate circuits or complete telephone installations at each position.

BRIEF DESCRIPTION OF THE DRAWINGS

The foregoing and other features and advantages of the invention will become apparent from the detailed description contained herein below, taken in conjunction with the drawings, in which:

FIG. 1 is an elevation view, in perspective, of a coin-operated telephone according to the present invention;

FIG. 2 is a side elevation view of the structure shown in FIG. 1, with portions thereof illustrated in alternate positions;

FIG. 3 is a fragmentary plan view of a portion of the transmitter-receiver support arm employed in the telephone installation of FIG. 1;

FIG. 4 is an elevation view of a portion of the structure shown in FIG. 2 and illustrating an alternate means for supporting the structure;

FIG. 8 is a sectional view taken on line 8—8 of FIG. 7, with the transmitter-receiver support arm in a lowered position and illustrating one means for returning the arm to the upright position;

FIG. 9 is a view similar to FIG. 8 and illustrating another means for returning the support arm to the upright position;

FIG. 10 is a view similar to FIG. 8 and illustrating a further means for returning the support arm to the upright position;

FIG. 11 is a view similar to FIG. 2 and illustrating an alternate embodiment of the invention;

FIG. 12 is an enlarged fragmentary sectional view taken on line 12—12 of FIG. 11;

FIG. 14 is a view similar to FIG. 11 and illustrating a further embodiment of the invention;

FIG. 15 is a front elevation of a further embodiment of the invention used as a drive-up phone;

FIG. 16 is a fragmentary sectional view taken on line 16—16 of FIG. 15 and showing certain elements in an alternate position;

FIG. 17 is a fragmentary front perspective view showing a further embodiment of the invention useful as a drive-up phone;

FIG. 18 is a sectional view of the structure shown in FIG. 17 shown in a collapsed position;

FIG. 19 is a fragmentary front elevation view of a further modification of the embodiment of FIG. 2;

FIG. 20 is a sectional view taken on line 20—20 of FIG. 19;

FIG. 21 is a top plan view, on an enlarged scale, of the structure shown in FIG. 19, with certain parts broken away to more clearly show other parts;

FIG. 22 is a fragmentary front elevation view similar to FIG. 1 and showing another embodiment of the invention;

FIG. 23 is a fragmentary sectional view taken on line 23—23 of FIG. 22 with the transmitter-receiver support arm illustrated in broken lines in a raised position and illustrating one means for releasing the arm to the full-line use position;

FIG. 24 is a top plan view of the embodiment shown in FIG. 22;

FIG. 25 is a side elevation view of a modification of the invention shown in FIGS. 22-24;

FIG. 26 is a front elevation view of a modification of the invention shown in FIGS. 1 through 10;

FIG. 27 is a side elevation view of the structure shown in FIG. 26;

FIG. 28 is a front elevation view similar to FIG. 26 and illustrating a further embodiment of the invention;

FIG. 29 is a side elevation view of the structure shown in FIG. 28;

FIG. 30 is a view similar to FIG. 26 and showing a further modification of the invention; and FIG. 31 is a side elevation view of the structure shown in FIG. 30.

DESCRIPTION OF THE PREFERRED EMBODIMENT

Figure 5:
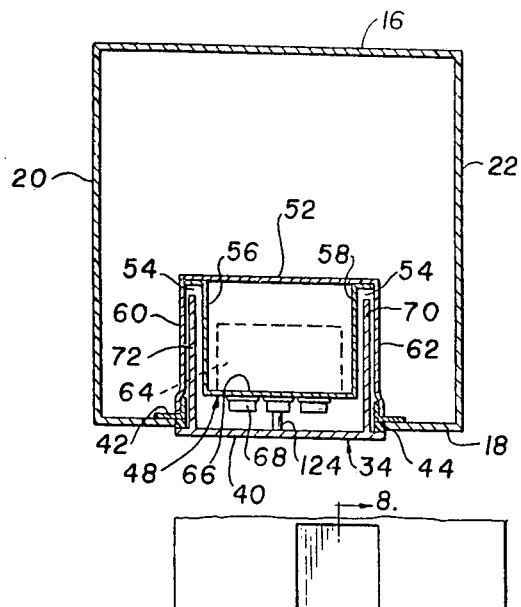
FIG. 5 is a sectional view, on an enlarged scale, taken on line 5—5 of FIG. 1, and with portions of the telephone equipment omitted for purposes of more clearly illustrating the support structure.
Figure 6:
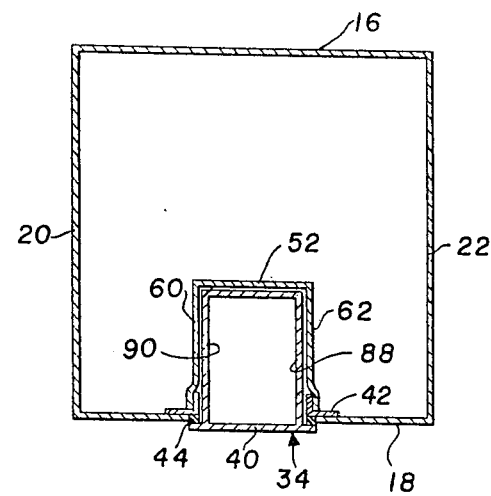
FIG. 6 is a view similar to FIG. 5 and taken on line 6—6 of FIG. 1.

Referring now to the drawings in detail, a coin-operated public telephone installation according to one embodiment of the invention is shown in FIGS. 1 through 10 and designated generally by the reference numeral 10. The installation includes an upright, generally rectangular support structure in the form of a post 12 rigidly mounted on and projecting upwardly from a flat base flange 14 adapted to be rigidly anchored to a supporting floor surface such as a concrete sidewalk 15 or the like. Alternatively, as illustrated in FIG. 4, the post 12 may have its base cast or anchored directly in the concrete support surface. Post 12 has a hollow interior defined by back and front walls 16, 18, respectively, and opposed side walls 20, 22 rigidly joined at the corners of the structure. Back wall 16 and the side walls 20, 22 may be substantially flat and smooth and have their external surfaces decorated in a manner to readily identify the structure as a telephone installation. An illuminated sign 24 may be supported directly on the top end 26 of post 12 to call attention to the structure and, if desired, the connecting wires may lead into the installation through the top of the installation. The sign may consist of a rectangular frame assembly 28 supporting translucent plates 30 having the word "telephone" or other appropriate symbol painted thereon, and a suitable light source such as a conventional fluorescent tube 31 may be positioned within the sign to illuminate the sign on the four sides of the installation. A light-conducting acrylic rod 32 or other suitable structure may be provided to conduct light from the area of the light source 31 to illuminate the dial area of the phone.

The front wall 18 of post 12 has an elongated, vertically extending opening 33 in its upper portion, and an elongated arm member 34 is pivotally mounted, as by hinge 36, on the bottom edge 38 of the opening. A structural angle frame 42 is rigidly welded to the inner surface of front panel 18 adjacent the peripheral edge of the opening 33. Frame 42 extends slightly inward past the edge of the opening 33 to provide a shoulder for supporting a sealing gasket 44 which cooperates with the inner peripheral edge surface of arm 34 to seal the opening when the arm is in the raised position. A suitable pull handle 45 is provided on the front surface of arm 34.

An elongated shallow, outwardly open receptacle or box 46 is mounted within the hollow interior of post 12, with the open peripheral edge portion of box 46 being rigidly connected to and supported by the angle frame 42. The box 46 has a vertical profile generally corresponding to that of the opening 33 and defines a closed recess 47 within the front wall 18. A generally rectangular instrument housing 48 is mounted, as by fasteners 50, on the back wall 52 of box 46 within the lower portion of the recess 47. The transverse width of housing 48 is less than the width of the opening 33, leaving an open slot 54 on each side of the housing 48 between its side walls 56, 58, respectively, and the side walls 60, 62, respectively, of the box 46. A telephone instrument 64, indicated in broken lines in FIG. 5, is mounted on the front wall 66 of housing 48, with dial pushbuttons 68 projecting forwardly from the wall 66 at a height accessible to short persons and persons seated in wheelchairs, yet convenient to taller persons as well. Also as shown in FIG. 5, the instrument housing 48 and the dial buttons 68 are spaced inwardly from the inner surface of arm 34 when the arm is in the raised, closed position. The term "telephone instrument" as used herein is intended to designate components of a conventional telephone instrument excluding the transmitter and receiver or handset. Also, while the telephone instrument components are schematically shown in the drawings as being enclosed within a housing, it is understood that the rigid structural components of applicants' structure renders such conventional instrument housing unnecessary and in fact various components may be positioned in various locations with the structure.

Figure 7:
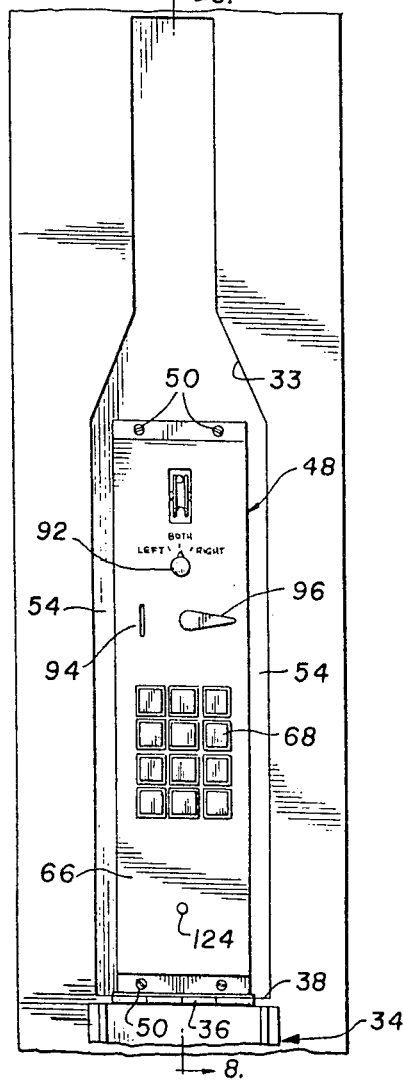
FIG. 7 is an enlarged front elevation view of a portion of the structure shown in FIG. 1.

A pair of reinforcing plates 70, 72 are rigidly welded, one adjacent to each side edge of front wall 40 of the arm 34, in position to project one into each of the vertical slots 54 when the arm is in the raised position. As best seen in FIGS. 1 and 7, the arm 34 and the opening 33 each have a relatively wide, rectangular portion extending from their base throughout a substantial portion of their height, and a substantially more narrow, rectangular top portion, with the two rectangular portions being joined by a central, isosceles trapezoidal section. Reinforcing plates 70, 72 each terminate at the base of the trapezoidal section, and a rigid transmitter-receiver housing 74 mounted on the upper, or smaller end portion of arm 34 extends from the top of plates 70, 72 to the upper end of the arm. The front profile of housing 74 corresponds to the profile of the top portion of arm 34 so that housing 74 can project into the upper portion of recess 47 above housing 48.

A pair of transmitters 76, 78 are mounted one on each of the inclined side walls 80, 82 of housing 74, and a pair of receivers, or speakers, 84, 86 are mounted one on each of the vertical side wall portions 88, 90, of the housing. Suitable conductors, not shown, extend from the transmitters and receivers along the interior of the arm 34 to the telephone instrument 64 within the instrument housing 48. The relative angles of the housing side walls 80, 88 and 82, 90 are such that one of the receivers can be positioned adjacent the ear of a user and the transmitter on the same side of the arm will be located in position for the user to speak into the transmitter.

As shown in FIG. 7, a selector switch 92 located on the front wall 66 of instrument housing 48 enables a person using the phone to selectively use the transmitter-receiver pair on either the left or right side of the arm for use, or alternatively to select both transmitter-receiver pairs to enable two persons at the same phone to participate in the conversation simultaneously. Also, a conventional coin slot 94 and coin return lever 96 are located on the front wall 66. Conventional coin actuating, identifying, and rejecting mechanisms, not shown, are preferably contained within the housing 48, and a coin guide tube 98 extends from instrument housing 48 within the interior of post 12, to a coin box 100 located adjacent a locked door 102 in front wall 18 at a point substantially below the instrument housing. A coin return slot 104, with suitable coin guiding means, not shown, can also be provided for the return of bent coins and the like.

In the embodiment shown in FIGS. 1 through 8, a recess 105 can be provided in the front portion of post 12 for housing a directory binding 106. Binding 106 is preferably supported by a flexible cable 108 attached to a suitable rewind mechanism 110 located within post 12. Thus, to use a directory mounted within the binding 106, the binding is withdrawn from the recess 105, unwinding the cable 108 to permit access to the directory in front of the phone installation. Upon release of the directory, the rewind mechanism will retract cable 108 to support the directory in the position shown. If desired, the recess 105 may extend through the back wall 16 to permit access to the directory from both sides of post 12. A metal sleeve 111 mounted in post 12 provides a closed lining for recess 105.

In the embodiment shown in FIGS. 2 and 8, a flexible cable 112 has one end rigidly fixed, as by clamp 114, to an inner surface of arm 34 and extends through an opening 116 in the front wall 66 of housing 48 and a second opening 118 in the back wall 52 of box 46. The other end of cable 112 extends around a reel 120 of a recoil assembly supported by a bracket 122 on the back wall 52. The recoil assembly is spring biased to automatically maintain a tensile load in the cable 112 to return arm 34 to the upright position shown in FIG. 1 from the lowered position shown in FIG. 2. Reel 120 preferably includes a friction brake or other suitable dampening mechanism to control the rate of movement of the arm between the upright and lowered positions. A switch 124 projecting forward from wall 66 is engaged and actuated to open the circuit to the telephone instrument 64 automatically when arm 34 is returned to the raised position. Thus, the automatic take-up reel mechanism and cut-off switch eliminate the well-known problem in conventional pay phone installations of a receiver being left off of the hook.

FIG. 9 shows a modification of the mechanism for controlling movement of the arm 34 between the upright and lowered positions. In this modification, the returned cable 112 extends over a guide pulley 126 within the interior of post 12, and is secured to a weight 128. An energy absorbing bumper assembly 130 is employed for slowing the movement of arm 34 as it approaches the upright position. The bumper 130 includes a curved rod 132 attached to a piston slideably mounted within a curved cylinder or sleeve 134. Rod 132 is biased to the extended position illustrated by suitable means such as a coil spring contained within cylinder 134, with the spring being compressed by the force of the weight 128 acting on the arm 34 when the arm is in the raised position. By restricting the flow of air from the cylinder 134, while permitting free flow of air into the cylinder by a suitable one-way valve and flow restrictor, not shown, a dash-pot effect may also be employed to resist rapid depression of the rod 132. In addition, the weight 128 may be suspended within a cylindrical guide sleeve having a one-way valve in its bottom end operable to permit free flow of air into the sleeve as the arm 34 is lowered and weight 128 is raised, while preventing flow out of the valve. In such an arrangement, the restricted flow of air between the inner surface of the cylindrical guide sleeve and the outer cylindrical surface of the weight 128 will provide a dampening effect limiting the rate at which the weight 128 falls and thereby the rate at which the arm 34 is raised to the upright position. Alternatively, by restricting the flow of air into the closed bottom end on such a guide sleeve, a partial vacuum can be created below the weight as it is raised, thereby restricting the rate at which the arm 34 can be lowered.

A further modification of the arm closing mechanism is illustrated in FIG. 10 in which a lever 136 is rigidly mounted on and extends downwardly from the bottom end of arm 34, with lever 136 extending through a slot 138 in the bottom portion of the receptacle 46. The piston 140 of a conventional spring biased, air-dampened door closing mechanism 142 is pivotally connected to the end of lever 136, with the cylinder end of the door closer 142 being pivotally connected to a fixed bracket 144 on the inner surface of front wall 18. Thus, lowering the arm 34 projects the piston 140 against the force of the spring mechanism contained in the door closer 142, which spring force is then employed to return the arm 34 to the upright position when released. In this embodiment, the arm 34 is illustrated as being supported by pivot pins 146 spaced inwardly from the front wall 18, with the hinge 36 being eliminated. This arm mounting arrangement may also be employed in combination with a suitable weight or a constant force spring closing mechanism acting vertically on the end of lever 136 so that, as arm 34 is returned to the upright position, the lever arm of such constant force device is reduced, thereby reducing the effective force on the arm 34 as it approaches the final closed position. Other actuating mechanisms for raising the arm, and for preventing it from closing with excessive force or velocity, may readily be conceived, the described devices being by way of illustration only.

Figure 13:
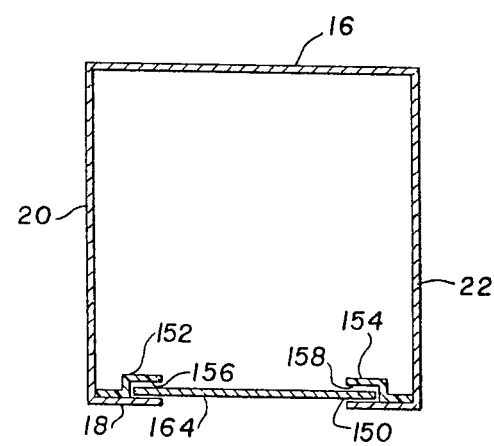
FIG. 13 is a sectional view, taken on line 13—13 of FIG. 12.

Referring now to FIGS. 11 through 13, an alternate embodiment of the invention is illustrated in which a substantially rectangular, vertically elongated opening 150 is provided in front wall 18, and a pair of elongated, offset guide plates 152, 154 are rigidly mounted on the inner surface of wall 18, one on each side of and adjacent to opening 150. Plate members 152, 154 cooperate with the inner surface of front wall 18 to define a pair of opposed vertically extending guide channels or grooves 156, 158 extending along the inner surface of front wall 18 from a point spaced below the bottom of the opening 150 to a point spaced above the opening. Structural angle stops 160, 162 are rigidly welded to the inner surface of the front wall 18 at the ends of guide channels 156, 158.

A flat instrument mounting plate 164 has its opposed side edges positioned within the grooves 156, 158 for vertical sliding movement from a lowered position in which its bottom edge abuts the angle stop 160 to a raised position in which its upper edge abuts the angle stop 162. A handle member 166 is mounted on the front surface of the plate 164 and projects outwardly therefrom through the opening 150 in position to enable a person to grasp the handle and slide the plate between the raised and lowered positions. Suitable gasket means, not shown, is provided within the channels 156, 158 between the inner surface of wall 18 and plate 164 to provide an effective weather seal and, if desired, to provide limited frictional resistance to movement of the plate between the raised and lowered positions.

A pair of brackets 168, 170 are rigidly mounted on and project inwardly from the inner surface of mounting plate 164, one adjacent each end thereof. A first length of cable 172 has one end attached to the bracket 170 at the top of the plate and extends therefrom over a pair of fairlead pulleys 174, 176 mounted within the post. The other end of cable 172 is attached to a generally cylindrical-shaped weight 178 for counterbalancing the weight of the plate 164 and the telephone equipment mounted thereon as described hereinbelow. A second cable 180 has one end attached to the bottom of weight 178 and extends downward and over a pair of fairlead pulleys 182, 184 and has its other end attached to the bracket 168 on plate 164.

Weight 178 is supported for sliding movement within a cylindrical sleeve 186 having its inner surface closely conforming to the surface of the weight 178. Closure caps 188, 190 on the top and the bottom end, respectively, of sleeve 186, each have a central aperture through which the cables 172, 180 pass. The apertures in the closure caps have a diameter only slightly greater than the diameter of the cables to restrict the flow of air into and out of the sleeve. Suitable bushings can be provided in the apertures in end closures 188, 190, or cables 172, 180 may have a coating of low-friction plastic material having a diameter such as to form an effective seal with the apertures.

As can be seen from FIG. 12, any vertical movement of the mounting plate 164 will produce a corresponding and simultaneous movement of the weight 178 in the opposite direction. Since the weight 178 substantially counterbalances the weight of the mounting plate and any equipment supported thereon, movement of the mounting plate can be accomplished with little effort; however, rapid movement of the mounting plate will be effectively resisted by the dash-pot effect obtained by the fact that the weight 178 acts as a piston moving in cylindrical sleeve 186, forcing air to flow through the restricted space around the cables passing through the closure caps and between the weight and the contiguous walls of the sleeve.

Preferably the weight of the plate 164 and the apparatus mounted thereon and that of the counterbalancing weight 174 are sufficiently different that the plate will be biased to automatically return to a non-use position, either at the fully raised or lowered position, upon completion of use of the instrument. However, only a slight force on the handle structure 166, or a slight inward force on the face of plate 164 will maintain the plate and phone instrument at the desired location during use. A suitable switch 191 mounted on the inner surface of plate 164 in position to engage one of the angle stops 160, 162 may be employed to de-energize the phone circuit when the plate is returned to the non-use position.

In this embodiment, the telephone instrument 64 is mounted directly on the inner surface of the mounting plate 164, with the instruments' dial buttons 68 projecting through the mounting plate for access at the front of the installation. Preferably suitable sealing means are provided around the respective buttons 68 to prevent moisture from entering the enclosure. As illustrated, a transceiver 192 is mounted on the inner surface of the mounting plate 164, with a plurality of small openings 194 being formed in mounting plate 164 in front of the transceiver to permit the passage of sound. If desired, a diaphragm seal, not shown, may be positioned over the openings on the inner surface of plate 164.

A conventional coin slot 196 is formed in the mounting plate above the instrument 64, with the coin slot 196 communicating, through a conventional coin actuating mechanism not shown, with a coin guide tube 198 supported on the mounting plate 164 for vertical movement therewith. Guide tube 198 includes a vertically extending lower section 200 which is telescopingly received in the upper end of a second tube 202 fixedly supported within the post 12. Tube 202 has its lower end positioned directly above a coin entrance opening 204 in the coin storage box 100 located at a point spaced substantially below the opening 150 in the front wall 18. Door 102 provides access to the coin storage box 100 as described hereinabove.

A person desiring to use this embodiment of the invention can position the telephone instrument so that the transceiver 192 is located at a height corresponding to the height of his ear within the limits defined by the vertical movement of mounting plate 164. Thus, the instrument can easily be used by either a tall or short person while standing or by a handicapped person in a wheelchair. The transceiver 192 is illustrated as being employed in place of the conventional separate transmitter-receiver units, but such conventional units may readily be mounted on the face of the mounting plate making it convenient for the telephone user to place his ear directly against the receiver.

A further embodiment of the invention is schematically illustrated in FIG. 14 wherein a plurality of transceiver units 192 are mounted in vertical spaced relation to one another along the front wall 18. In this embodiment, the separate transceiver units can be connected to a single telephone instrument 64 as illustrated in the drawing, and interconnected so that either one or more transceivers may be selectively used by use of a selector switch 206. Alternatively, a plurality of telephone instruments may be installed in the single post, with each instrument being at a different height and each being connected to one or more transceivers. While this arrangement does not permit exact height adjustment, the multiple transceivers enable the use of the devices without discomfort as it is not necessary to speak directly into the transceiver or to have the ear positioned directly in front of the transceiver to use the instrument. When a single telephone instrument 64 is employed, it is installed at a height accessible to both standing and sitting persons. The telephone apparatus, including both the instrument 64 and the transceiver 192, is completely enclosed within the vertical post structure 12 and is therefore protected against weather and vandalism. The dial actuating buttons 68 are accessible through openings in the front wall 18 or alternatively the instrument 64 may be mounted on a separate plate which, in turn, is mounted over a single large access opening in the front wall 18.

FIGS. 15 through 18 illustrate the invention employed as a drive-up public telephone. In this arrangement, the post 12 is intended to be installed adjacent a curb or at other locations in which an automobile may conveniently be driven alongside the front wall 18. The embodiment of FIGS. 15 and 16, and that of FIGS. 17 and 18 each represent only slight modifications of the embodiment of FIGS. 1 through 10 and only the components which are different are specifically described and designated by different reference numerals. Thus, in FIGS. 15 and 16, the transmitter-receiver structure is supported in an arm 210 pivotally mounted for movement between a stored position within a rectangular recess 212 in the front wall 18 and a use position in which the arm swings out and down to expose the dial buttons 68 of the telephone instrument 64 mounted on the inner surface of the rear wall 214 of an outwardly open, recessed liner or housing 216.

A single transceiver 218 is mounted on the outwardly swinging end portion of arm 210 in position to be directed inwardly and upwardly into the interior of an automobile when the arm is lowered to a use position adjacent to or resting on the automobile door with the door window down. In this position, a person seated in the automobile can readily reach the coin slot 220 and dial buttons 68 through the open window of the automobile above the transceiver arm 210. The position of the transceiver, i.e., directed outwardly and upwardly on the end of the transceiver arm, is convenient for use both by persons seated in an automobile and by persons standing or seated adjacent the post 12. Upon conclusion of the telephone conversation, the transceiver arm 210 is automatically returned to the upright position in the manner described above with regard to the embodiment of FIGS. 1 through 10. As in the previously described embodiment, the coin box is located within the hollow interior of the post 12 at a position substantially below the telephone instrument.

The modification shown in FIGS. 17 and 18 differs from that of the embodiment of FIGS. 15 and 16 only in the construction of the transmitter-receiver support arm 222. In this modification, arm 222 comprises a telescoping assembly including an outer sleeve 224 having one end pivotally mounted to the front wall 18 of post 12 for movement between the upright stored position and the outwardly projecting use position. A second, inner sleeve 226 is slideably supported within the outer sleeve 224 for movement between the extended position shown in full line in FIG. 17 and retracted position telescoped into the interior of outer sleeve 224.

The inner sleeve 226 has an elongated slot 228 formed in its top surface and a spherical seat 230 formed in its outwardly projecting end for receiving and supporting a spherical ball 232 on one end of a transmitter-receiver support 234, with the spherical ball and spherical seat forming a swivel joint to enable limited axial rotational and pivotal movement of the transmitter-receiver support on the end of sleeve 226. When not in use, the transmitter-receiver support is adapted to be pivoted into the slot 228 for storage before sleeve 226 is telescoped into the sleeve 224. Suitable detent means, not shown, may be provided to prevent inward telescoping movement of the inner sleeve 226 into outer sleeve 224 until the transmitter-receiver support is securely stored within the slot 228. Similarly, suitable interlock means, not shown, may be provided to prevent automatic pivotal movement of the arm assembly to the upright, stored position until the transmitter-receiver support and inner sleeve are telescoped into the outer sleeve. The return or collapsing telescoping movement may be automatically accomplished, as by spring biasing, upon storage of support 232 in sleeve 226. Operation of the embodiment of FIGS. 17 and 18 is thus substantially the same as that described with regard to the embodiment of FIGS. 15 and 16. The structural components within the post 12 can be identical in the two embodiments.

FIGS. 19, 20, and 21 illustrate a further modification of the invention which, while not so limited, is particularly well suited for use in high noise areas such as along heavily traveled streets and highways or in or near airports, truck terminals and the like. This embodiment differs from the embodiments of FIGS. 1 through 10 only in the construction and arrangements of the top portion of the pivoted arm supporting the transmitter and receiver and only this portion of the structure will be described in detail. Thus, the generally Y-shaped transmitter-receiver arm assembly 240 is pivotally mounted, as by hinge 242, for movement between a use position in which the arm is swung out and down as in FIG. 20, and non-use position stored within a generally complementary Y-shaped opening 244 in the front wall 18 of post 12. An outwardly open receptacle or liner 246 is mounted in the opening 244 and forms an outwardly open recess 248 for storing the arm 240. The generally rectangular instrument housing 48 is mounted on the rear wall 250 of receptacle 246, and the telephone instrument 64 is mounted in the housing 48 with its dial pushbuttons 68 projecting forwardly from the front wall 66 for access when the arm 240 is in the lowered or used position.

Arm 240 includes a base portion defined by a front wall or plate 252 supported by the hinge 242, and rearwardly directed side reinforcing plates 254, 256 which extend along the side edges of housing 48 when the arm is in the raised or stored position as described above with reference to the embodiments of FIGS. 1 through 10. A first transverse plate 258 extends between the top of reinforcing plates 254, 256, and a pair of outwardly flaring gussets 260, 262 extend upwardly from the front and rear edges, respectively, of plate 258. Preferably, the front gusset 260 is formed as an integral part of front plate 252. A second transverse plate 264 is mounted between gusset 260, 262 in spaced relation to the plate 258, and a transmitter 266 is mounted in the space 268 between plates 264 and 258. Plate 264 has a plurality of holes formed therein to permit the free transmission of sound.

A pair of upwardly and outwardly diverging receiver mounting arms 270, 272 are mounted one on each side edge of the bottom transverse plate 258 as by spring hinges 274. Arms 270, 272 extend between the outwardly flaring ends of gusset members 260, 262 and cooperate therewith to define an upwardly open recess 273 above the transmitter 266. Arms 270, 272 are supported for limited movement toward and away from one another and are normally resiliently urged toward one another by the spring hinges 274. The ends of the transverse plate 264 limit the movement of the arms toward one another, and the top end surface of the reinforcing plates 254, 256 abut the lower ends of the arms to limit movement of the arms away from one another.

A pair of receivers 276, 278, respectively, are mounted on the upwardly projecting ends of arms 270, 272, respectively, for movement therewith. The receivers 276, 278, respectively, are surrounded by ear cups 280, 282 mounted on the inner or facing surfaces of the arms 270, 272 in position to fit over and receive the ears of a person using the phone. When the ear cups are in position, a person using the phone can talk directly into the recess 273 above the transmitter 266 so that the transmitter is shielded from background noise both by the gussets 260, 262 and by the head of the person using the phone. The resiliently supported receiver arms readily adapt themselves to fit snugly over the ears of any size person so that background noise does not interfere with use of the phone. Also, the counterbalanced, pivoted arm 240 permits the phone to be used by persons of any height as described above with reference to the embodiments of FIGS. 1 through 10.

The embodiment of the invention shown in FIGS. 22-24 differs from that illustrated in FIGS. 19-21 in that the telephone instrument, which may be a conventional coin operated public telephone instrument, is mounted in a recess in the front wall 18 with the front surface of the telephone instrument housing being substantially flush with the front wall 18, and with the coin box (not shown) being located substantially below the telephone instrument behind locked door 102. Alternatively, the telephone instrument may be mounted on the inner surface of wall 18 in the manner described above, with the dial actuating buttons accessible through openings in wall 18.

In the embodiment of FIGS. 22-24, the front wall 18 of post 12 is wider than in the previously described embodiments, and the transmitter-receiver support arm 204 is located at one side of the telephone instrument. The transmitter-receiver support arm 284 has its top end pivotally mounted on front wall 18, at the access opening therein, by horizontally extending pivot pins 286. Thus, arm 284 swings outward and upward from its stored position shown in broken line in FIG. 23 to the extended or use position shown in full lines in this FIG. Arm 284 is a hollow structure, generally rectangular in cross-section and tapering from a relatively small size at its top, pivotally mounted end to an enlarged head 288 at its lower, or free swinging end. A combined transmitter-receiver, or transceiver, 290 is mounted in the head portion 288 in much the same manner that transmitter 266 is mounted in the pivoted arm of the embodiment shown in FIGS. 19-21. An elongated bar or handle 292 projects outwardly from and extends along the front surface of the arm to facilitate grasping and swinging the arm to the use position.

Arm 284 has a counterbalance lever 294 rigidly mounted on its upper, pivoted end, with lever 294 projecting into the interior of post 12. A flexible cable 296 has one end fixed to the free end of the lever 294 and its other end around a reel 298 of a recoil assembly supported on a bracket 300 on the inner surface of front wall 18 at one side of the access opening therein which receives the arm 284. The recoil assembly is spring biased to apply a load to the end of lever 294 to counterbalance the weight of the arm 284 and the transceiver 290 mounted therein. The lever 294 and reel 298 are arranged such that, when the support arm 284 is in the raised, use position, the distance from the pivot pin 286 to the cable 296 is substantially greater than when the arm is in the lowered position, thus enabling the weight of the transceiver arm to overcome the tension in the cable to return the transceiver to be stored within the hollow support when not in use. Preferably, in the fully stored position shown in broken lines in FIG. 23, the cable 294 swings past the pivot axis defined by pin 286 so that the tension in the cable applies a light force tending to retain the transceiver in the stored position. This light force is, however, easily overcome by a slight pull on the handle 292 and thereafter, the arm is substantially counterbalanced by the recoil mechanism. Preferably the transceiver head 288 is of a generally funnel-like configuration with the transceiver 290 recessed into the open end of the head.

FIG. 25 illustrates a modification of the embodiment shown in FIGS. 22-24 wherein the transceiver support arm 302 is pivoted at its lower end for movement out and down to a use position shown in the drawing and returned, automatically, to the upright stored position much in the same manner of the embodiments shown in FIGS. 1-10 and 15-21. The transceiver support arm may be identical to that employed in the embodiment of FIGS. 22-24 or, alternatively, the transceiver support head 304 may be mounted on the free swinging end of arm 302, as by pins 306 so that the open, funnel-shaped transceiver support head can be pivoted, as desired, to enable a person using the phone to more readily talk directly into the open end of the funnel-shaped head. This pivoted head arrangement could, of course, be employed on the arm 284, if desired.

FIGS. 26 through 31 illustrate various arrangements for supporting a telephone directory either completely or partially within the confines of the support post 12 of the phone installations described above. Thus, in FIGS. 26 and 27, a directory 308 is shown mounted within a hard-back binding 310 which, in turn, is mounted on an elongated arm 312 having one end povitally mounted by suitable hinge 314, to the front wall 18 at the bottom edge of a rectangular opening 316 spaced laterally from the transmitter-receiver arm 34. A rectangular sleeve 318 is fitted within the opening 316 and extends rearwardly therefrom to the back wall 16 to define a confined space in the interior of post 12 within which the directory is stored when the arm 312 is in the upright position. In the upright or stored position, arm 312 engages suitable weather seal means, not shown, around the peripheral edge of the opening 314 to provide a weather-tight seal protecting the directory.

To use the directory, the arm 312 is grasped by a suitable exterior handle means 320 and swung outwardly and downwardly to withdraw the directory from the opening 316. As the directory binding 310 swings clear of the opening 316, it may be opened to the position shown in FIG. 26. A suitable counterbalancing mechanism such as that described above with regard to FIGS. 8 through 10 is preferably employed to balance the weight of the arm and directory so that it may be easily stopped or supported at any desired level to permit free use in front of the installation whether by a standing tall or short person or by a handicapped person in a wheelchair. After use, the directory is closed and arm 312 returned to the upright position where the directory is stored within the post 12. The over-center weight of the directory and binding assist in maintaining the arm in the firmly closed position.

In the embodiment of FIGS. 28 and 29, the directory 308 is stored at a level below the telephone instrument and swings outwardly and upwardly on a support arm 322 to the use position. The binder 324 mounted on arm 322 is of the type which, when closed, completely encloses the directory to protect it from weather. Arm 322 is pivotally supported, by suitable hinge 326 adjacent the back wall 16 within the post 12. A metal sleeve 328 fits within the rectangular opening 330 in the front wall 18 to provide a confined space into which the arm and directory pivot for storage. As with the embodiment of FIGS. 22 and 23, the directory may be used at any position in front of the post 12 when the binding 324 is clear of the opening 330. Also, suitable counterbalance means is preferably employed to balance the weight of the directory on an arm in the use position and provides for smooth easy movement between the use and storage positions. The weight of the directory and arm automatically return the directory to the stored position with the binding being closed automatically as it swings into the opening 330.

FIGS. 30 and 31 illustrate a modification of the directory binding and storage system of FIG. 2 wherein a recess 332 is formed in the front of the post 12 at a level immediately below the pivot point of arm 34. The directory binding 334 is supported on a retractable cable 336 extending through an upper wall 338 of the recess 330 to support the binding. Suitable retracting means such as a constant force spring reel, not shown, positioned within the post 12 can be employed to retract the cable 336 to automatically return it to its stored position after use.

Although numerous configurations of the invention have been illustrated and described, it is believed apparent that various other modifications might readily be made and those specifically disclosed herein are intended to emphasize the versatility of the invention. Thus, the post may be employed to support a plurality of telephone devices. For example, a rectangular post may have a telephone instrument on more than one side and, where space requirements permit, sound or privacy shields may be employed. While the invention has been described as embodying a support structure in the form of an elongated upright hollow post structure, it is believed apparent that other structural arrangements would be equally effective. Thus, the telephone support structure could be in the form of a hollow structural wall incorporated in a booth structure or a building structure. Thus, while specific embodiments have been disclosed and described in detail, we wish it understood that we do not intend to be restricted solely thereto, but rather that we do intend to include all embodiments thereof which would be apparent to one skilled in the art and which come within the spirit and scope of our invention.

We claim:

1. A vandal resistant public telephone installation comprising, in combination,
   a hollow support extending upwardly from a floor surface and having rigid external walls cooperating to define a closed inner chamber for housing telephone apparatus,
   an access opening formed in one wall of said hollow support,
   an elongated vertically extending arm member having one end pivotally mounted on said hollow support and moveable between a stored position and an extended position, said arm extending over and substantially closing said access opening when the arm is in the stored position and being pivotally moveable outward to said extended position,
   transmitter and receiver means mounted on said moveable arm for movement therewith,
   means permitting substantially unobstructed transmission of sound between said transmitter and receiver means and the exterior of said hollow support when said arm is in said extended position to enable a person adjacent the post to use the telephone at different heights above the floor surface adjacent the hollow support,
   coin collecting means supported within said hollow support at a location spaced substantially below said telephone instrument,
   coin guide means extending between said telephone instrument and said coin collecting means for guiding coins which have been employed to actuate said telephone instrument to said coin collecting means, and
   door means in a rigid external wall of said hollow support below said access opening means and providing access to said coin collecting means.

2. The invention as defined in claim 1 wherein said elongated arm has a closed compartment mounted thereon projecting into said hollow support through said access opening when said arm is in said stored position, said transmitter and receiver means being mounted within said closed compartment for movement with said elongated arm.

3. The invention as defined in claim 2 wherein said elongated arm has its top end pivotally mounted to said hollow support means adjacent the top of said elongated opening, said transmitter and receiver means being mounted adjacent the bottom end of said arm and moveable therewith outwardly and upwardly to the extended position.

4. The invention as defined in claim 2 wherein said elongated arm comprises a plurality of interconnected arm elements, said arm elements being moveable relative to one another to facilitate positioning said transmitter and receiver means for convenient use at various heights above the floor adjacent the hollow support means when the arm is in the extended position.

5. The invention as defined in claim 4 further comprising means biasing said arm to a stored position.

6. The invention as defined in claim 5 wherein said elongated arm has a closed compartment mounted thereon projecting into said hollow support through said access opening when said arm is in said stored position, said transmitter and receiver means being mounted within said closed compartment for movement with said elongated arm.

7. The invention as defined in claim 2 further comprising counterbalance means operable to counterbalance the weight of said arm in the extended position and to return the arm to the stored position upon completion of use of the instrument.

8. A vandal resistant public telephone installation conveniently useable by persons having a wide range of heights including handicapped persons in wheelchairs, comprising,
an upwardly extending hollow support having a substantially vertical outer wall,
an access opening in said vertical outer wall,
inner wall means mounted within the said hollow support and extending over said access opening,
coin-operated telephone instrument means mounted on said inner wall means on the side thereof opposite said access opening, said instrument means having dial actuating means extending through said inner wall means and accessible through said access opening,
transmitter and receiver means mounted within said hollow support, and
moveable support means mounting said transmitter and receiver means for movement between a raised and a lowered position.

9. The invention as defined in claim 8 wherein said inner wall means is vertically moveable along said vertical outer wall, and comprises said support member, said transmitter and receiver means and said coin-operated telephone instrument means being mounted on said support member for movement therewith between said raised and lowered positions.

10. The invention as defined in claim 9 further comprising counterbalance means operatively connected to and substantially counterbalancing the weight of said support member and said telephone instrument means mounted thereon.

11. The invention as defined in claim 10 wherein said counterbalancing means includes means biasing said support means for automatically returning the support means to one of said positions.

12. The invention as defined in claim 11 wherein said support member comprises an elongated arm pivotally mounted on said vertical wall for movement between a stored position substantially closing said access opening and an extended position projecting outwardly from said vertical wall, said transmitter and receiver means being mounted on said elongated arm for movement therewith out of said post to provide access to said transmitter and receiver means and enabling use of said telephone installation at various heights.

13. The invention as defined in claim 12 wherein said elongated arm has a closed compartment mounted thereon housing said transmitter and receiver means, said compartment being enclosed within said post when said arm is in said stored position.

14. The invention as defined in claim 13 wherein said arm comprises a plurality of interconnected arm elements, said arm elements being moveable relative to one another.

* * * * *